(12) United States Patent
Ishikura et al.

(10) Patent No.: US 7,513,666 B2
(45) Date of Patent: Apr. 7, 2009

(54) LED LIGHTING APPARATUS

(75) Inventors: Takuro Ishikura, Kashihara (JP); Yutaka Fujiyama, Niigata (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/056,760

(22) Filed: Mar. 27, 2008

(65) Prior Publication Data
US 2008/0239725 A1   Oct. 2, 2008

(51) Int. Cl.
*F21V 33/00* (2006.01)
(52) U.S. Cl. ............... 362/555; 362/560; 362/800; 362/410
(58) Field of Classification Search ......... 362/555, 362/560, 800, 410, 576
See application file for complete search history.

(56) References Cited
U.S. PATENT DOCUMENTS

| | | | | |
|---|---|---|---|---|
| 4,536,828 A | * | 8/1985 | Mori | 362/558 |
| 5,515,243 A | * | 5/1996 | Cassarly et al. | 362/560 |
| 5,575,550 A | * | 11/1996 | Appeldorn et al. | 362/559 |
| 6,155,703 A | * | 12/2000 | Rizkin et al. | 362/551 |
| 6,991,355 B1 | * | 1/2006 | Coushaine et al. | 362/555 |
| 7,201,509 B2 | * | 4/2007 | Erber | 362/560 |

FOREIGN PATENT DOCUMENTS

JP    2005-203135    7/2005

\* cited by examiner

*Primary Examiner*—Laura Tso
(74) *Attorney, Agent, or Firm*—Morrison & Foerster LLP

(57) ABSTRACT

An LED lighting apparatus includes an LED provided on a base, a rod-like light-guiding body having translucency that protrudes from the base, and a light reflector disposed in a vicinity of an upper end of the rod-like light-guiding body. Light from the LED is incident on a lower end of the rod-like light-guiding body, exits from the upper end via the rod-like light-guiding body, and is reflected by the light reflector.

8 Claims, 13 Drawing Sheets

FIG.3
FIG.4
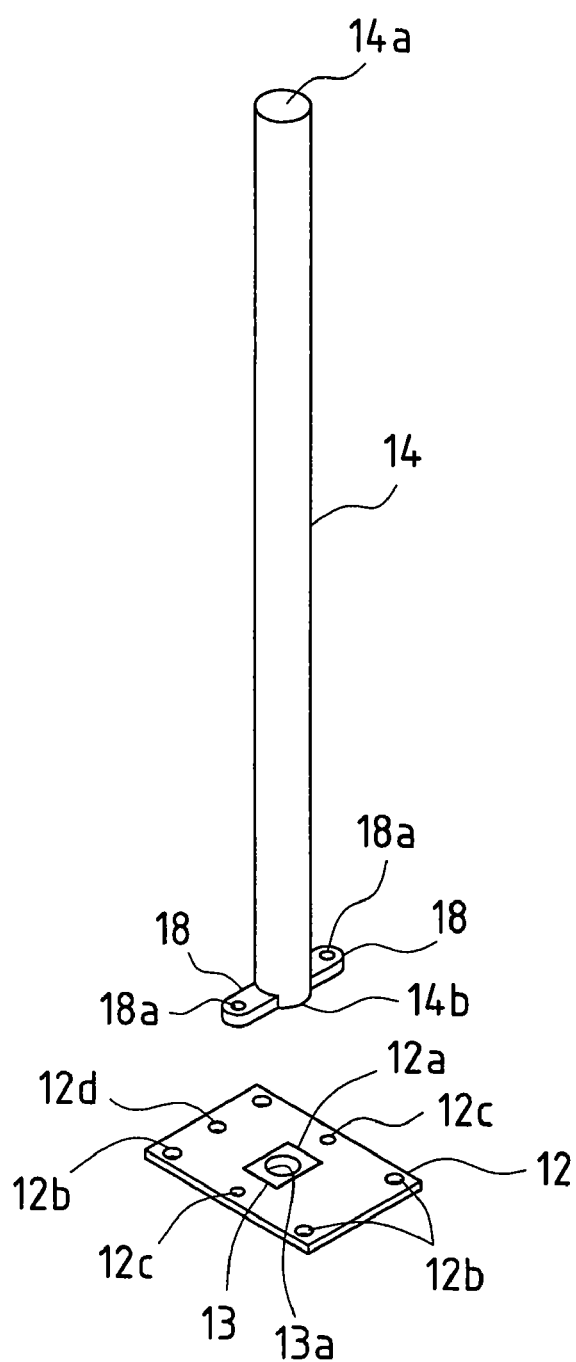
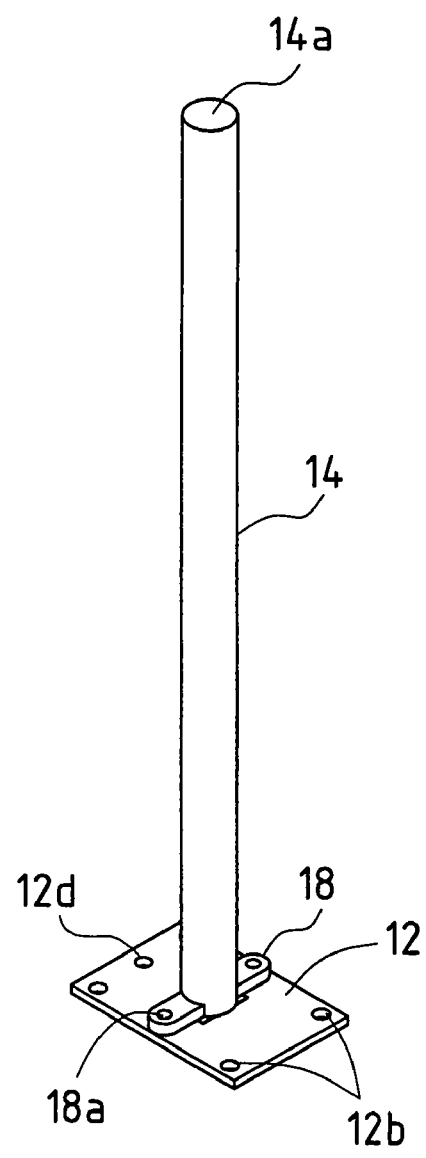

FIG.16
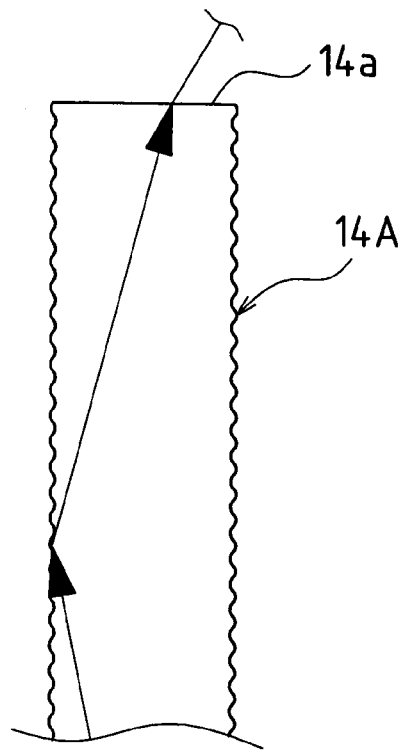
FIG.17  FIG.18  FIG.19  FIG.20
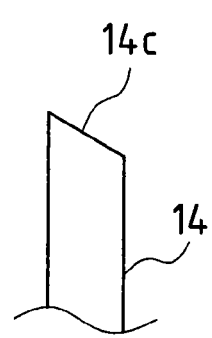 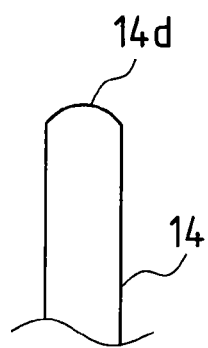 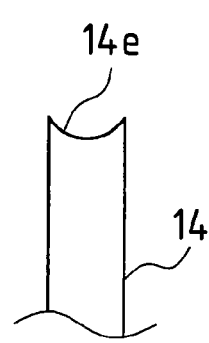 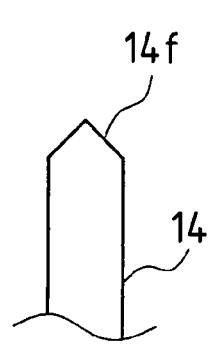

LED LIGHTING APPARATUS

BACKGROUND OF THE INVENTION

This application claims priority under 35 U.S.C. § 119(a) on Patent Application No. 2007-085365 filed in Japan on Mar. 28, 2007, the entire content of which is herein incorporated by reference.

The present invention relates to an LED lighting apparatus suitable for table lighting, ambient lighting and the like.

A table lamp 101 as shown in FIG. 21 and an interior light 102 as shown in FIG. 22 are examples of lighting apparatuses that use LEDs (light emitting diodes) as the light source.

With this sort of lighting apparatus, glare is a problem when looking directly at that the LEDs, making it necessary to reduce glare. With the interior light 102 in FIG. 22, for example, you look straight at the light source of the interior light 102 when you look up, making it desirable to reduce glare. The LED light is therefore irradiated through a translucent white diffuser, for example, thereby reducing glare.

It is preferable not only to reduce the glare of LED light, but also to be able to adjust the irradiation direction and position of the light, for instance. In JP 2005-203135 A (hereinafter, patent document 1), for example, the irradiation direction of the LED light is appropriately set using a plurality of reflective mirrors.

However, even if the LED light is irradiated through a translucent white diffuser, enabling glare to be reduced, it is not possible to appropriately adjust the irradiation direction and position of the light.

Also, even if the use of a plurality of reflective mirrors as in patent document 1 enables the irradiation direction and position of the light to be adjusted, the configuration of the lighting apparatus become complex.

In view of this, the present invention, which was made in consideration of the foregoing conventional problems, has as its object to provide an LED lighting apparatus that enables glare to be reduced and the irradiation direction and position of the light to be set, while avoiding a complex configuration.

SUMMARY OF THE INVENTION

To solve the above problems, an LED lighting apparatus of the present invention includes an LED provided on a base, a rod-like light-guiding body having translucency that protrudes from the base, and a light reflector disposed in a vicinity of an upper end of the rod-like light-guiding body. Light from the LED is incident on a lower end of the rod-like light-guiding body, exits from the upper end via the rod-like light-guiding body, and is reflected by the light reflector.

According to this LED lighting apparatus of the present invention, LED light is repeatedly reflected by the inner periphery of the rod-like light-guiding body and gradually diffuses when passing through the rod-like light-guiding body, which means that diffused light exits from the upper end of the rod-like light-guiding body, and the light reflected by the light reflector is also diffused. This diffused light does not feel glary. Also, since the irradiation direction and range is specified by the reflection of the light reflector, efficient illumination is possible.

Further, LED light leaks from the outer periphery of the rod-like light-guiding body when passing through the rod-like light-guiding body, enabling the area around the rod-like light-guiding body to be softly illuminated by this leaked light.

Consequently, efficient illumination that does not feel glary and for which the irradiation direction and range of the light is specified can be performed using reflected light from the light reflector, and the area around the rod-like light-guiding body can at the same time be softly illuminated by light that leaks from the outer periphery of the rod-like light-guiding body.

Moreover, all that need be provided is a base, an LED, a rod-like light-guiding body and a light reflector, thereby avoiding a complex configuration.

In the above configuration, the light reflector may mirror reflect the light from the upper end of the rod-like light-guiding body.

Further, the light reflector may diffuse-reflect the light from the upper end of the rod-like light-guiding body.

These configurations allow the irradiation direction and range of the light to be clearly specified in the case of mirror reflection, and the irradiation range of the light to be broadened in the case of diffuse reflection. The choice of configuration can be made according to the primary usage of the lighting apparatus.

Also, the LED lighting apparatus may further include plural pairs of the LED and the rod-like light-guiding body, and in each pair, light from the LED may exit from the upper end of the rod-like light-guiding body and be reflected by the light reflector. This configuration enables brighter illumination.

Further, the upper end face of the rod-like light-guiding body may be one of a convex lenticular end face, a concave lenticular end face, a conical end face and an inclined end face. The extent of diffusion and the exit direction of light from the upper end face of the rod-like light-guiding body can thereby be variously set.

BRIEF DESCRIPTION OF THE DRAWINGS

FIG. 3 is a perspective view showing a process of attaching a tabular base of the LED lighting apparatus of FIG. 1.

FIG. 4 is a perspective view showing a process of attaching a rod-like light-guiding body of the LED lighting apparatus of FIG. 1.

FIG. 16 shows a variation of the rod-like light-guiding body.

FIG. 17 shows a variation of the upper end face of the rod-like light-guiding body in which the upper end face is inclined.

FIG. 18 shows a variation of the upper end face of the rod-like light-guiding body in which the upper end face has a convex lenticular shape.

FIG. 19 shows a variation of the upper end face of the rod-like light-guiding body in which the upper end face has a concave lenticular shape.

FIG. 20 shows a variation of the upper end face of the rod-like light-guiding body in which the upper end face is conical.

DESCRIPTION OF THE PREFERRED EMBODIMENTS

Hereinafter, embodiments of the present invention will be described in detail with reference to the accompanying drawings.

Figure 1:
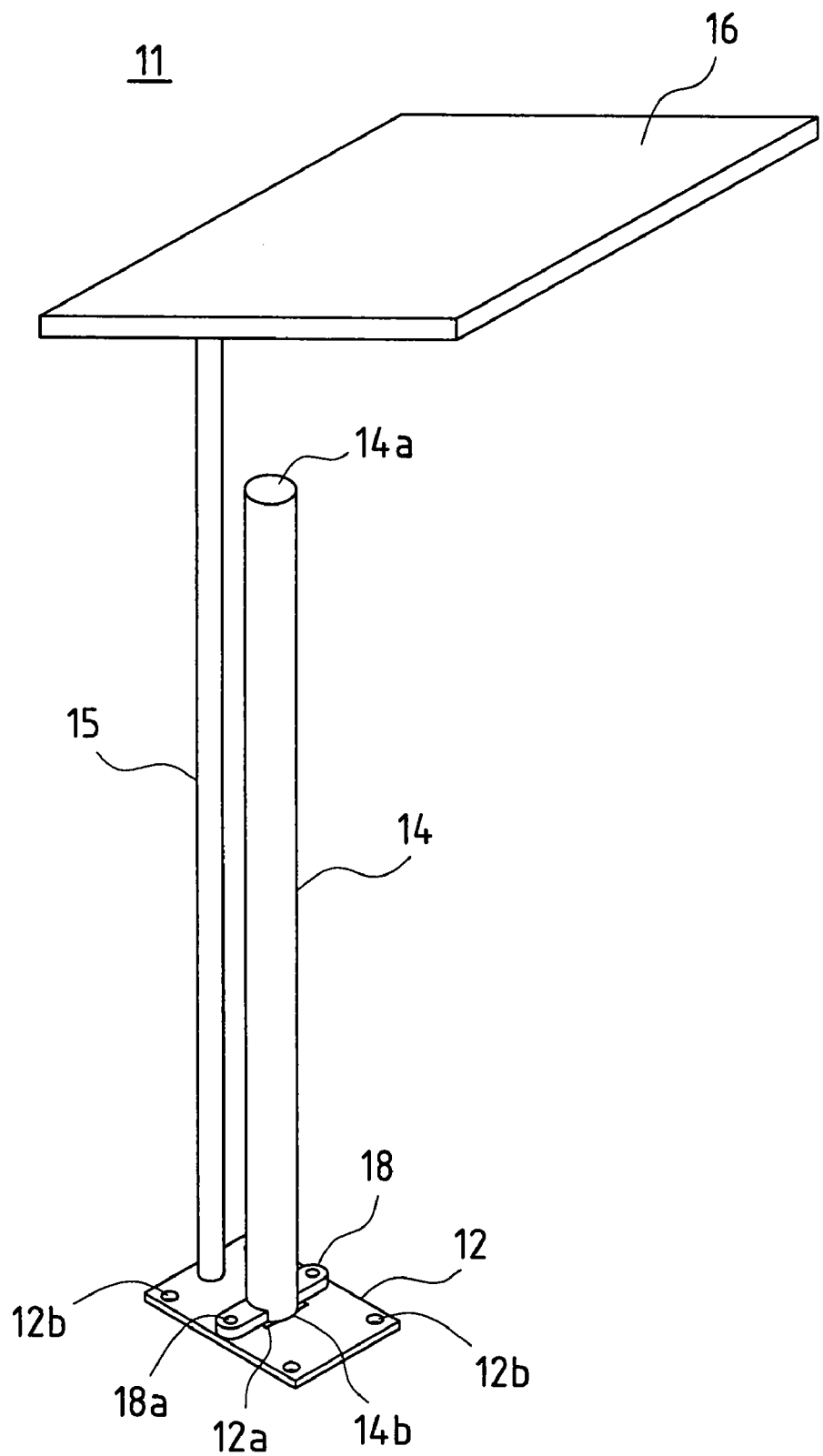
FIG. 1 is a perspective view showing a first embodiment of an LED lighting apparatus of the present invention.
Figure 2:
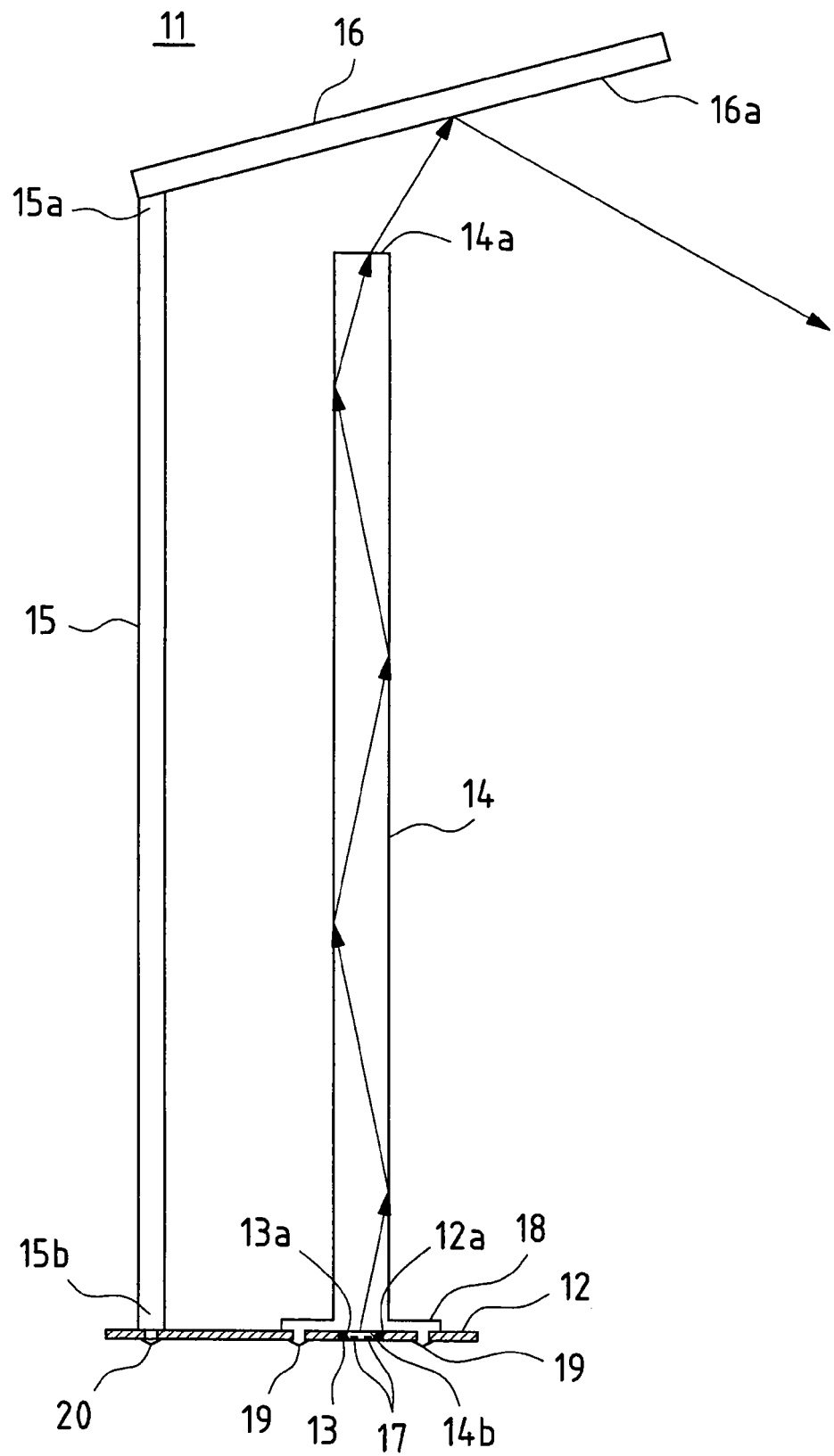
FIG. 2 is a cross-sectional view showing the LED lighting apparatus of FIG. 1.

FIGS. 1 and 2 are a perspective view and a cross-sectional view showing a first embodiment of an LED lighting apparatus of the present invention. The LED lighting apparatus 11 of the present embodiment includes a tabular base 12 fixed to the floor, a light source unit 13 disposed in a rectangular hole 12a in the middle of the tabular base 12, a rod-like light-guiding body 14 protruding up from the tabular base 12 where the light source unit 13 is positioned, a strut 15 protruding up from the tabular base 12 so as to be parallel with the rod-like light-guiding body 14, and a reflector 16 fixed to an upper end 15a of the strut 15 above an upper end 14a of the rod-like light-guiding body 14.

A small hole 12b is formed in each of the four corners of the tabular base 12 as shown in FIGS. 3 and 4. The tabular base 12 is placed on the floor, and screws (not shown) are screwed into the floor through the small holes 12b to fix the tabular base 12 to the floor.

The rectangular hole 12a is formed in the middle of the tabular base 12, and the light source unit 13 is mounted in this rectangular hole 12a. The light source unit 13 is composed of a circular opening 13a in the middle thereof, a substrate attached to the underside of the circular opening 13a, and a plurality of LEDs 17 provided on the substrate within the circular opening 13a.

The rod-like light-guiding body 14 is a cylindrical molded component composed of a synthetic resin having translucency, for example, and the upper end 14a and the lower end 14b thereof are flat and smooth. A pair of stays 18 that protrude laterally is fixed to the outer periphery of the rod-like light-guiding body 14 in a vicinity of the lower end 14b. The lower end 14b of the rod-like light-guiding body 14 is placed over the circular opening 13a of the light source unit 13 and disposed in proximity to the LEDs 17, while the stays 18 of the rod-like light-guiding body 14 are at the same time placed over the tabular base 12 and respective screws 19 (shown in FIG. 2) are screwed into screw holes 18a in the stays 18 through small holes 12c in the tabular base 12 from the underside of the tabular base 12 to fix the stays 18, with the rod-like light-guiding body 14 protruding up from the tabular base 12.

A screw hole is formed in the lower end 15b of the strut 15, and a screw 20 (shown in FIG. 2) is screwed into the screw hole in the lower end 15b of the strut 15 through a small hole 12d in the tabular base 12 from the underside of the tabular base 12, with the strut 15 protruding up from the tabular base 12. One end of the reflector 16 is fixed to the upper end 15a of the strut 15, and the reflector 16 is fixed at an angle after being positioned so that the middle thereof is above the upper end 14a of the rod-like light-guiding body 14.

The bottom face 16a of the reflector 16 is formed as a smooth reflective surface by performing a plating process on this bottom face 16a, and light is mirror reflected by this bottom face 16a.

When light exits from the LEDs 17 as shown by the arrows in FIG. 2, this light is incident on the lower end 14b of the rod-like light-guiding body 14. Since the lower end 14b of the rod-like light-guiding body 14 is disposed in proximity to the LEDs 17, most of the light from the LEDs 17 is incident on the lower end 14b of the rod-like light-guiding body 14. This incident light is repeatedly reflected by the curved inner peripheral surface of the rod-like light-guiding body 14 and gradually diffused while passing through the rod-like light-guiding body 14, and this diffused light exits from the upper end 14a of the rod-like light-guiding body 14. This diffused light is then incident on and reflected by the bottom face 16a of the reflector 16, and illumination is performed using this diffused light.

That is, LED light having a narrow luminous region is extremely glary when viewed directly, but as a result of being repeatedly reflected by the inner periphery of the rod-like light-guiding body 14, this light is converted so that the end face of the rod-like light-guiding body 14, which is sufficiently larger than the LEDs, is seen as the light source. In order to realize this conversion, the proportion of light transmitted without being reflected by the walls of the rod-like light-guiding body 14 needs to be sufficiently small. The rod-like light-guiding body 14 therefore needs to be sufficiently long relative to the size of the end face of the rod-like light-guiding body 14 (the diameter thereof if circular).

Since illumination is performed by reflecting diffused light thus emitted from the end face of the rod-like light-guiding body with the bottom face 16a of the reflector 16, the diffused light does not feel glary, allowing glare to be reduced. Also, illumination can performed efficiently in the reflection direction of the reflector 16. Appropriately setting the size, shape and angle of the reflector 16 enables the direction and range of illumination to be adjusted.

Also, since part of the light that passes through the rod-like light-guiding body 14 leaks from the outer periphery of the rod-like light-guiding body 14, the area around the rod-like light-guiding body 14 is softly illuminated by this leaked light.

Moreover, the configuration is simple since only the tabular base 12, the light source unit 13, the rod-like light-guiding body 14 and the reflector 16 need be provided.

Figure 5:
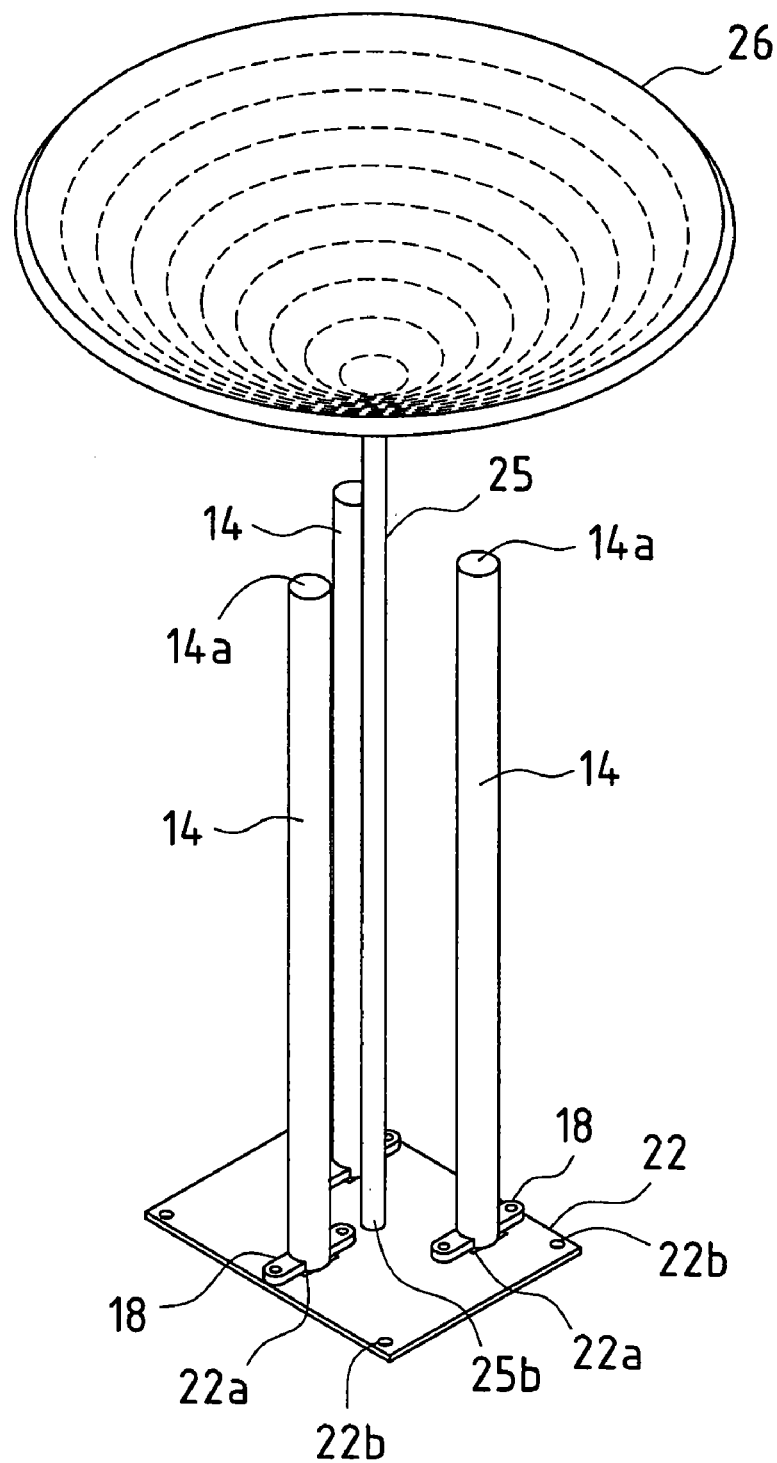
FIG. 5 is a perspective view showing a second embodiment of the LED lighting apparatus of the present invention.
Figure 6:
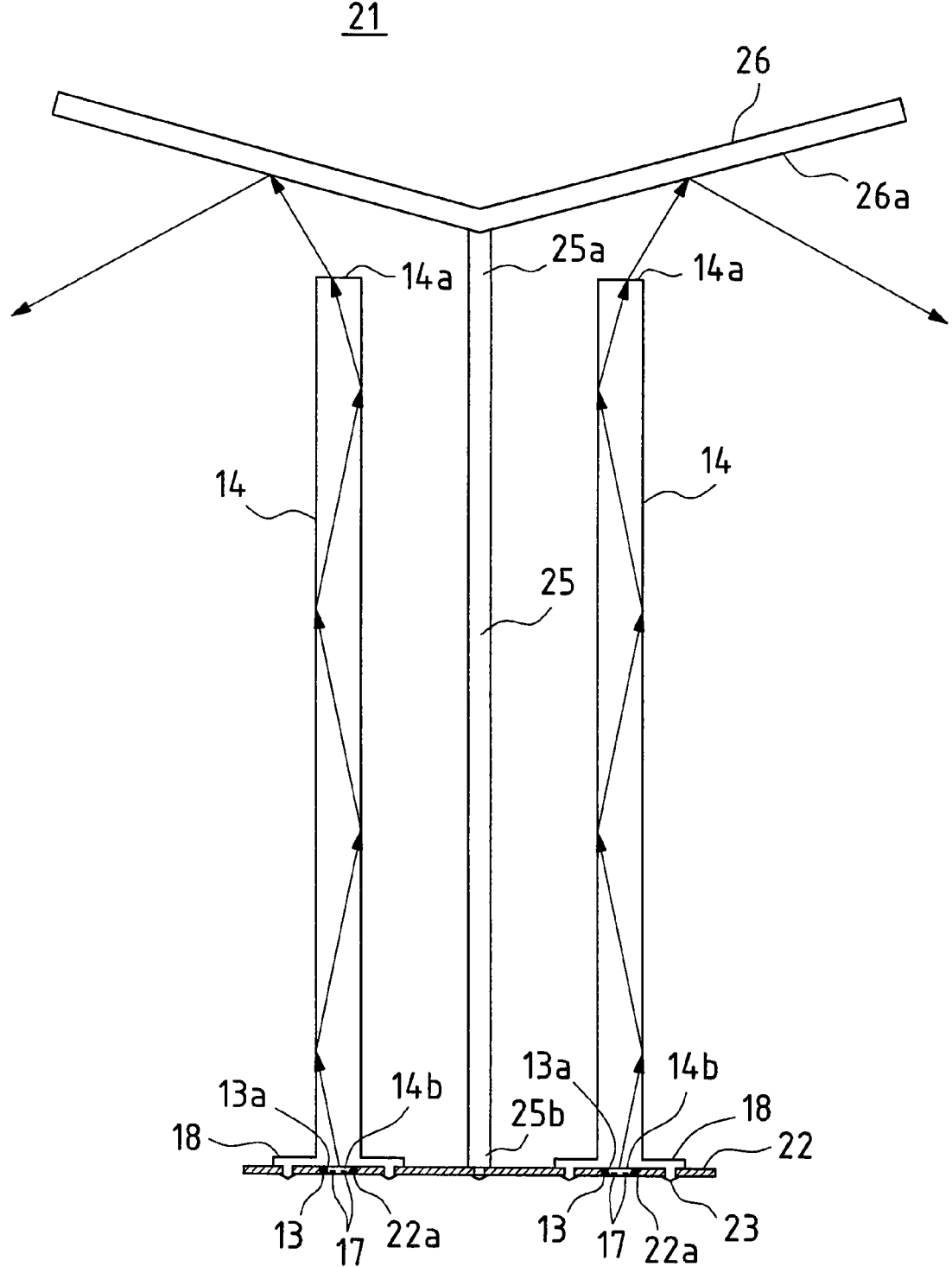
FIG. 6 is a cross-sectional view showing the LED lighting apparatus of FIG. 5.

FIGS. 5 and 6 are a perspective view and a cross-sectional view showing a second embodiment of the LED lighting apparatus of the present invention. Note that in FIGS. 5 and 6, the same reference numerals are attached to sites that perform a similar action to FIGS. 1 and 2.

The LED lighting apparatus 21 of the present embodiment includes a tabular base 22 fixed to the floor, three light source units 13 disposed in three holes 22a formed in the tabular base 22, three rod-like light-guiding bodies 14 protruding up from the tabular base 22 where the light source units 13 are positioned, a strut 25 protruding up from the tabular base 22 in the middle of the rod-like light-guiding bodies 14, and an inverted conical reflector 26 fixed to an upper end 25a of the strut 25 above the upper ends 14a of the rod-like light-guiding bodies 14.

Consequently, the LED lighting apparatus 21 has three pairs of the light source unit 13 and the rod-like light-guiding body 14.

Figure 7:
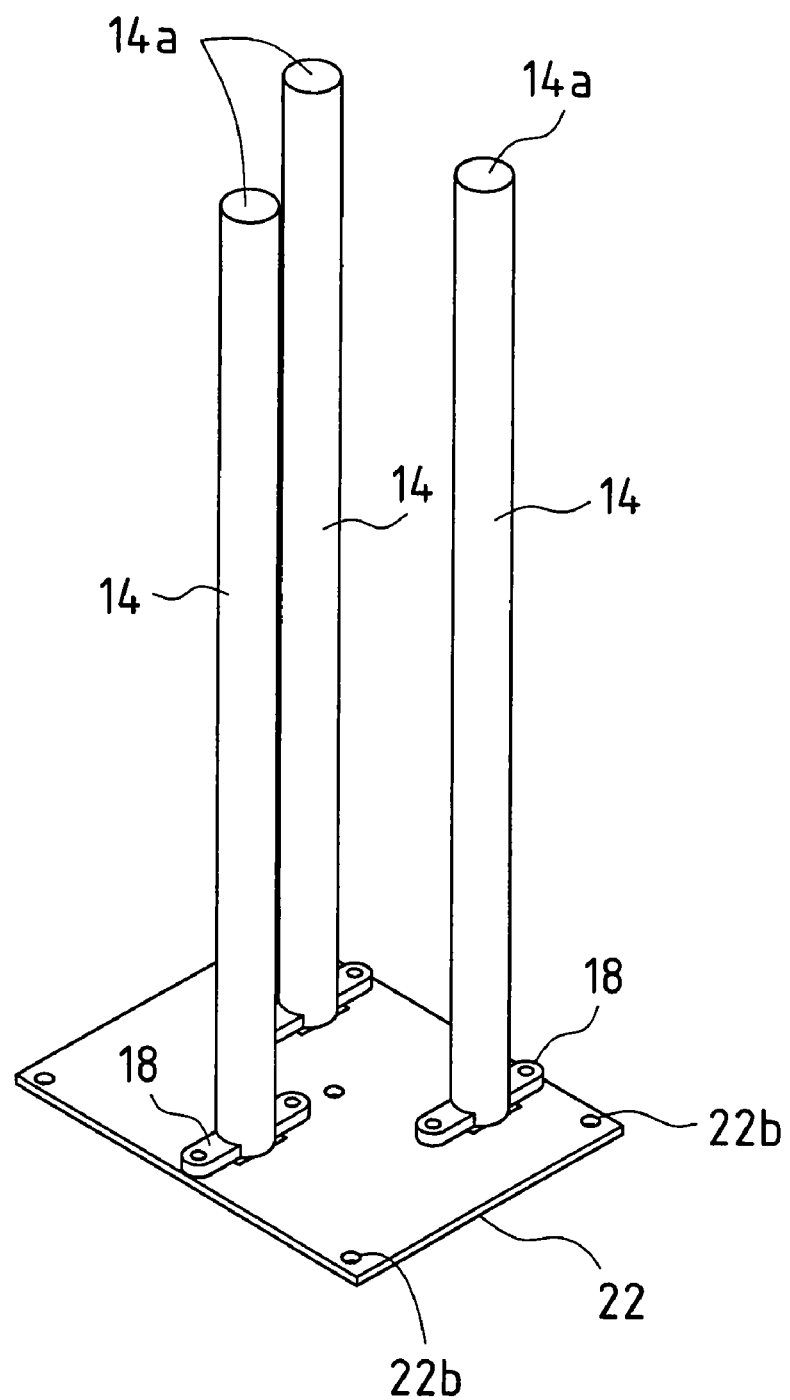
FIG. 7 is a perspective view showing a state in which three rod-like light-guiding bodies are attached to a tabular base of the LED lighting apparatus of FIG. 5.

The tabular base 22 is placed on the floor as shown in FIG. 7, and respective screws (not shown) are screwed into the floor through the small holes 22b to fix the tabular base 22 to the floor.

The respective light source units 13 are mounted in the three holes 22a in the tabular base 22, with the respective rod-like light-guiding bodies 14 protruding up from where the light source units 13 are positioned. The lower ends 14b of the rod-like light-guiding bodies 14 are placed respectively over the circular openings 13a in the light source unit 13, and disposed in proximity to the LEDs 17, while the stays 18 of the rod-like light-guiding bodies 14 are at the same time placed over the tabular base 22 and screwed down, with the rod-like light-guiding bodies 14 protruding up from the tabular base 22.

The lower end 25b of the strut 25 is screwed down after being positioned in the middle of the rod-like light-guiding bodies 14, with the strut 25 protruding up from the tabular base 22. Further, the middle of the inverted conical reflector 26 is fixed to the upper end 25a of the strut 25, and the reflector 26 is positioned so as to cover the upper ends 14a of the rod-like light-guiding bodies 14.

The bottom face 26a of the inverted conical reflector 26 has an inverted conical shape, and a plating process is performed thereon to form this bottom face 26a into a smooth reflective surface. Light is mirror reflected by this bottom face 26a.

When light exits from the LEDs 17 of the light source units 13 in this configuration as shown in FIG. 6, this light is incident on the lower ends 14b of the rod-like light-guiding bodies 14, and diffused as it is repeatedly reflected by the inner peripheral surface of the rod-like light-guiding bodies 14. The diffused light exits from the upper ends 14a of the rod-like light-guiding bodies 14, and is incident on and reflected by the bottom face 26a of the reflector 26, with illumination being performed using this diffused light.

The position of incidence of diffused light on the bottom face 26a of the reflector 26 is different for each rod-like light-guiding body 14, with the respective positions of incidence of diffused light from the rod-like light-guiding bodies 14 being 120 degrees apart from each other around the inverted conical bottom face 26a of the reflector 26. Also, the inverted conical bottom face 26a of the reflector 26 has a convex curvature. Therefore, diffused light from each of the rod-like light-guiding bodies 14, when reflected by the bottom face 26a of the reflector 26, is irradiated and spread in directions oriented 120 degrees away from each other. The area around the lighting apparatus 21 is thereby substantially uniformly illuminated. Of course, the diffused light does not feel glary, allowing glare to be reduced.

Also, since part of the light that passes through the rod-like light-guiding bodies 14 leaks from the outer periphery of the rod-like light-guiding bodies 14, the area around the rod-like light-guiding bodies 14 is thereby softly illuminated.

Figure 8:
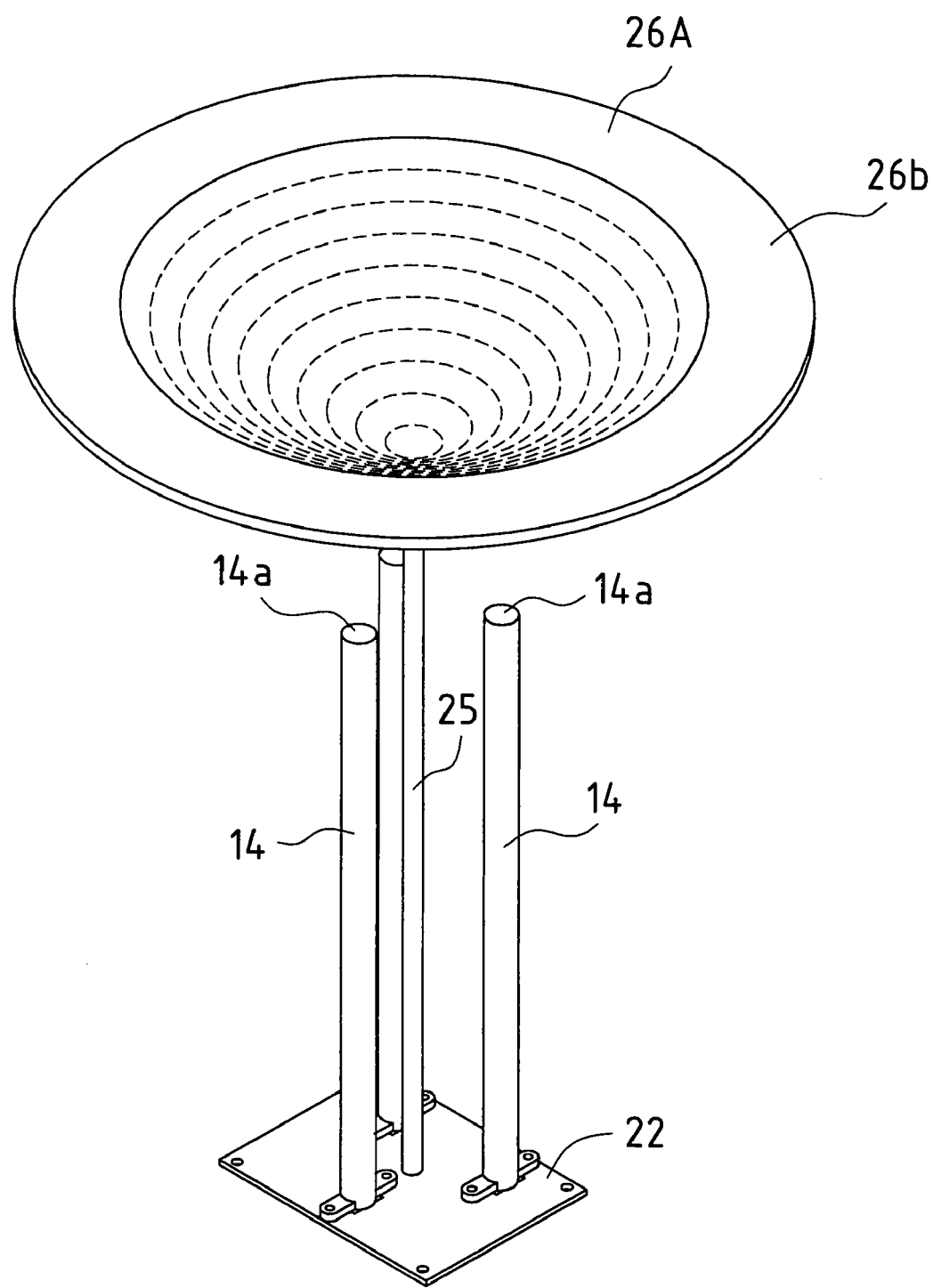
FIG. 8 is a perspective view showing a variation of the LED lighting apparatus of FIG. 5.
Figure 9:
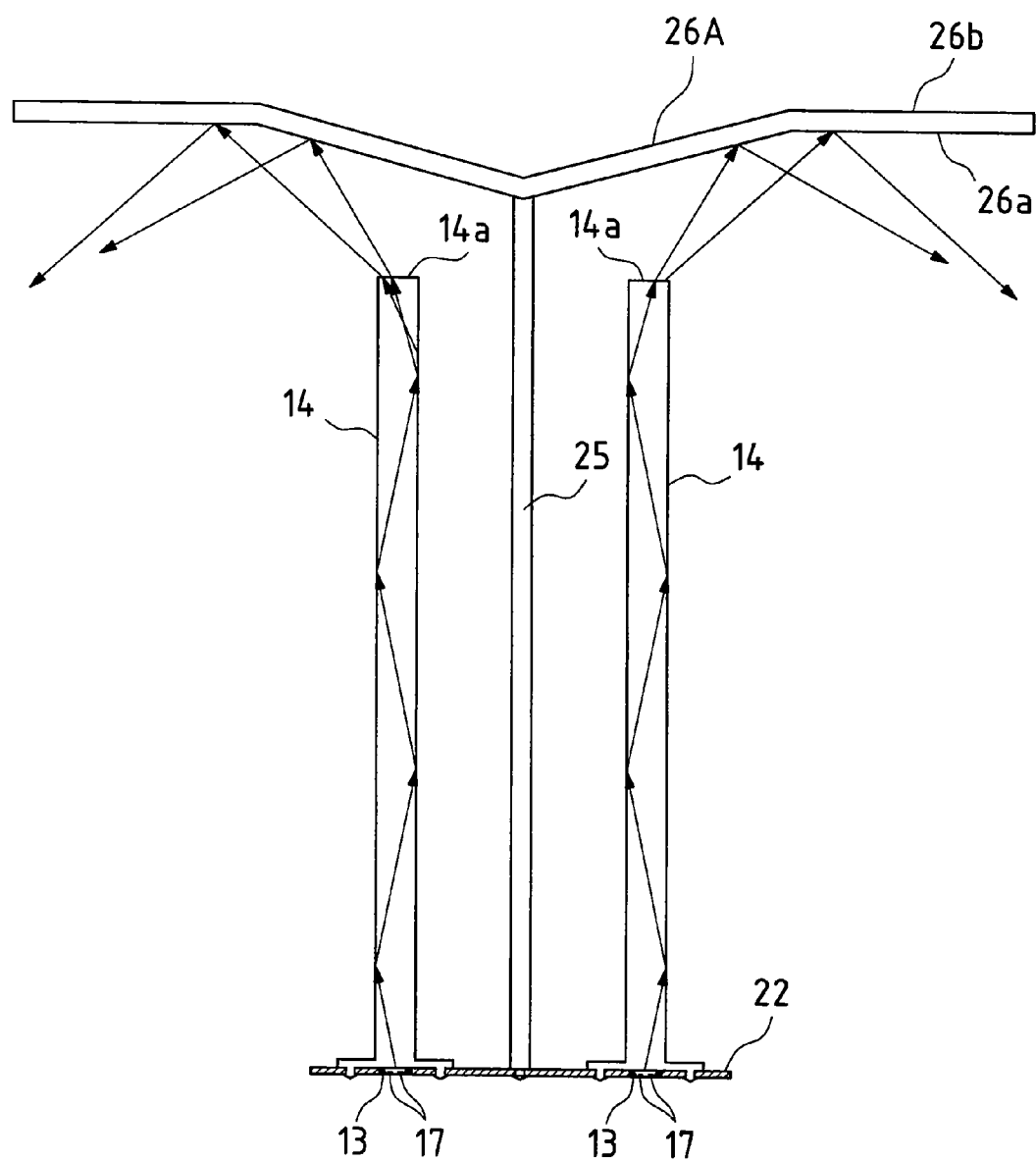
FIG. 9 is a cross-sectional view showing the LED lighting apparatus of FIG. 8.

Note that a reflector 26A as shown in FIGS. 8 and 9 may be provided instead of the reflector 26. This reflector 26A has a flat brim 26b around the circumference thereof, and the bottom face of this flat brim 26b faces directly downward. Therefore, diffused light from the rod-like light-guiding bodies 14 is reflected diagonally downward by the bottom face of the brim 26b and irradiated onto the floor, allowing illumination of the floor and ambient illumination by light reflected from the floor to be performed.

Figure 10:
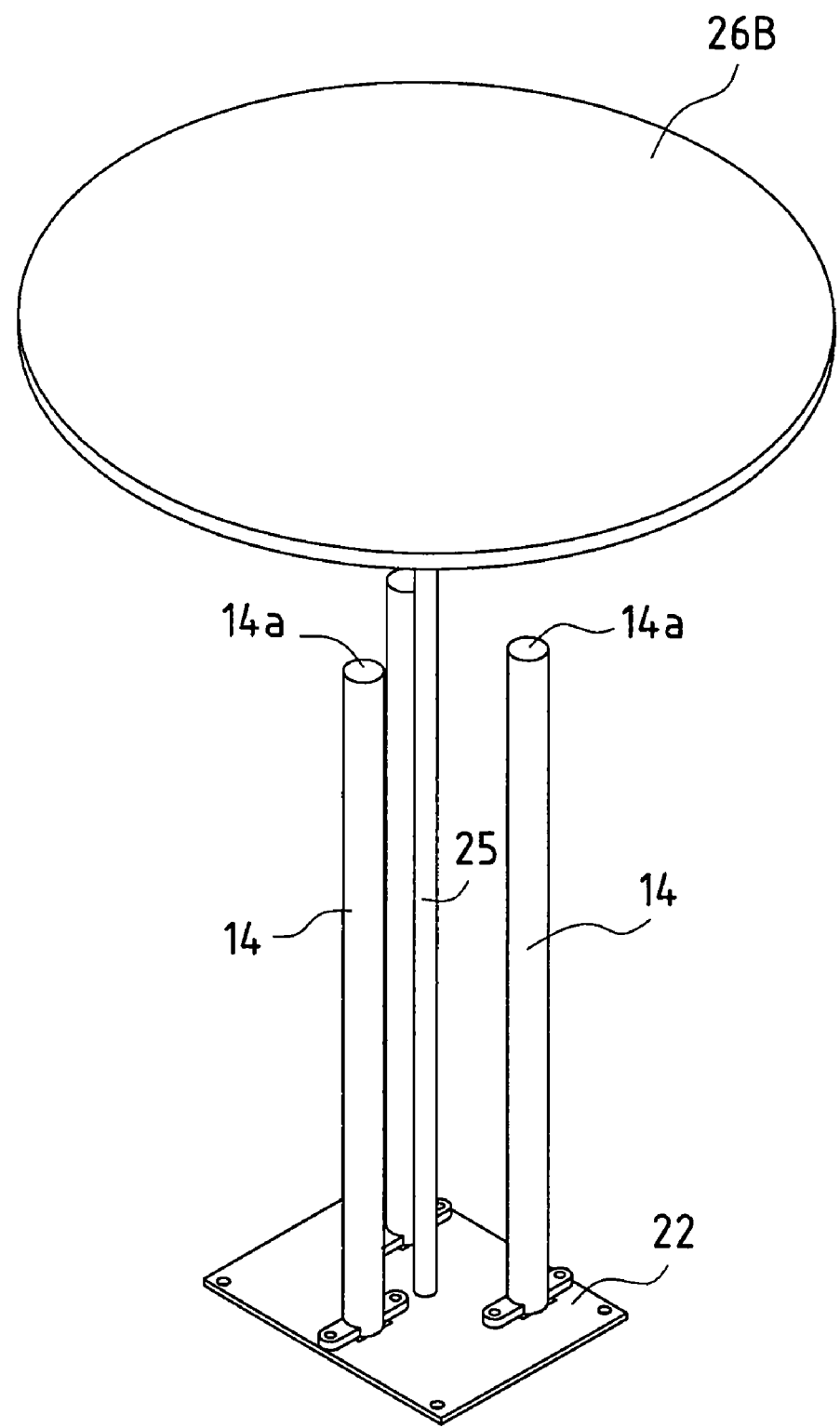
FIG. 10 is a perspective view showing another variation of the LED lighting apparatus of FIG. 5.
Figure 11:
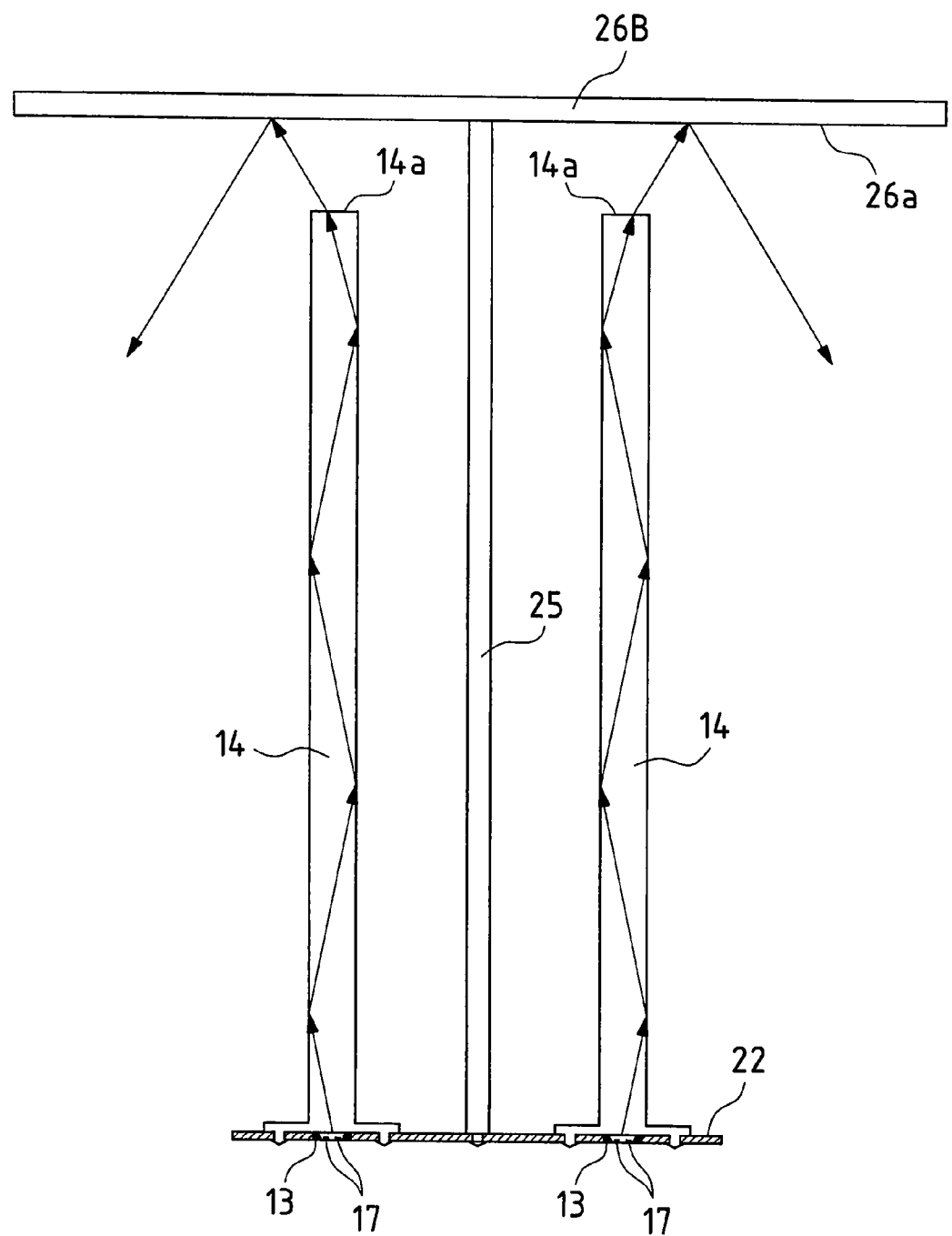
FIG. 11 is a cross-sectional view showing the LED lighting apparatus of FIG. 10.
Figure 12:
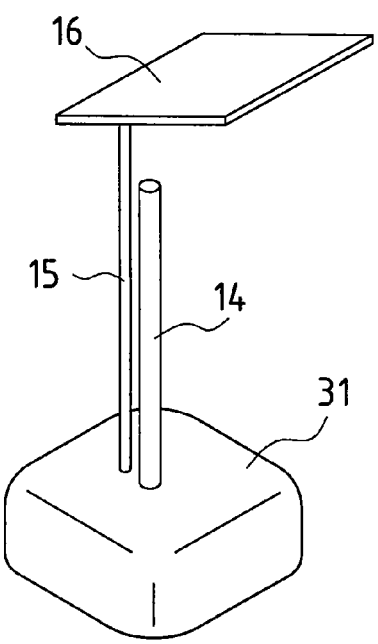
FIG. 12 is a perspective view showing a variation in which the lighting apparatus of FIG. 1 is portable.
Figure 13:
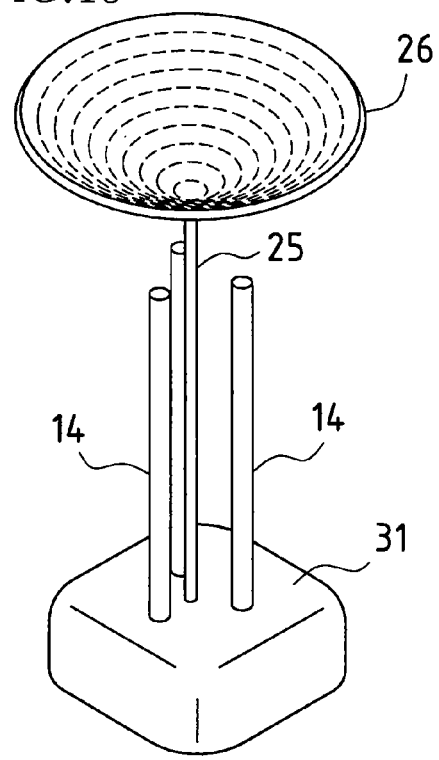
FIG. 13 is a perspective view showing a variation in which the lighting apparatus of FIG. 5 is portable.
Figure 14:
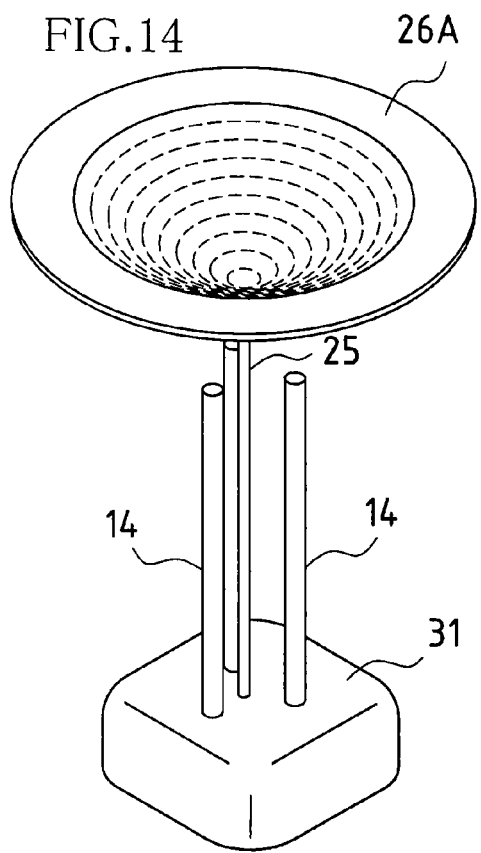
FIG. 14 is a perspective view showing a variation in which the lighting apparatus of FIG. 8 is portable.
Figure 15:
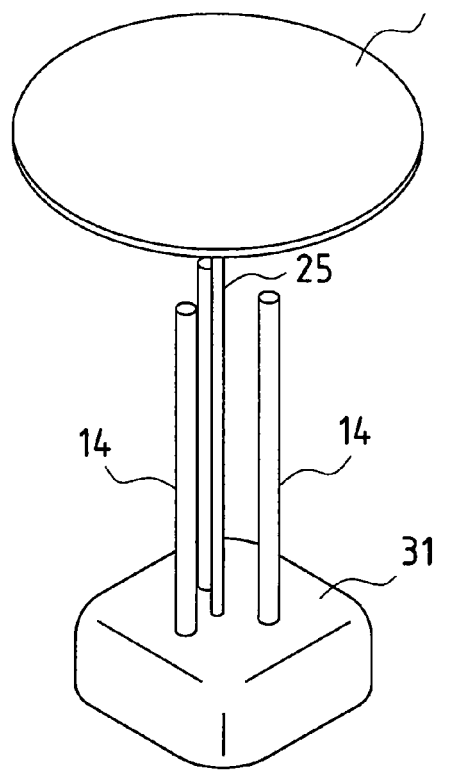
FIG. 15 is a perspective view showing a variation in which the lighting apparatus of FIG. 10 is portable.
Figure 21:
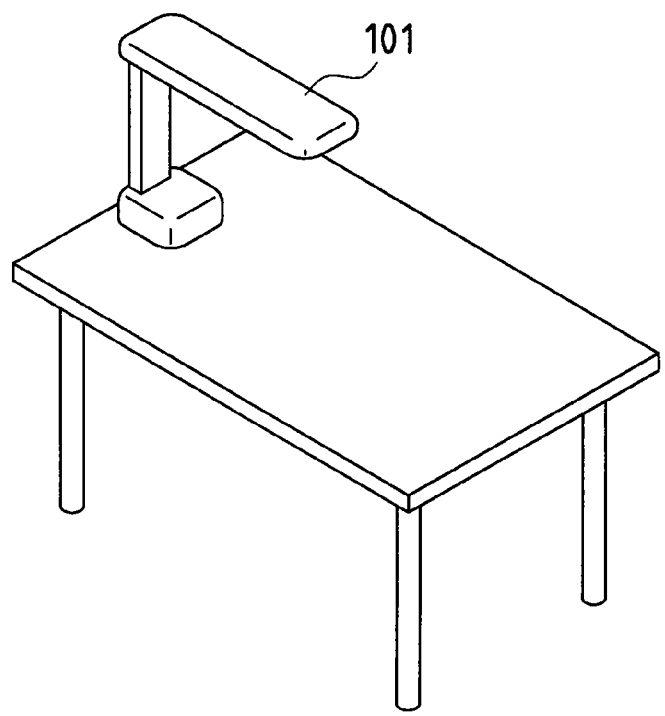
FIG. 21 is a perspective view showing a conventional table lamp.
Figure 22:
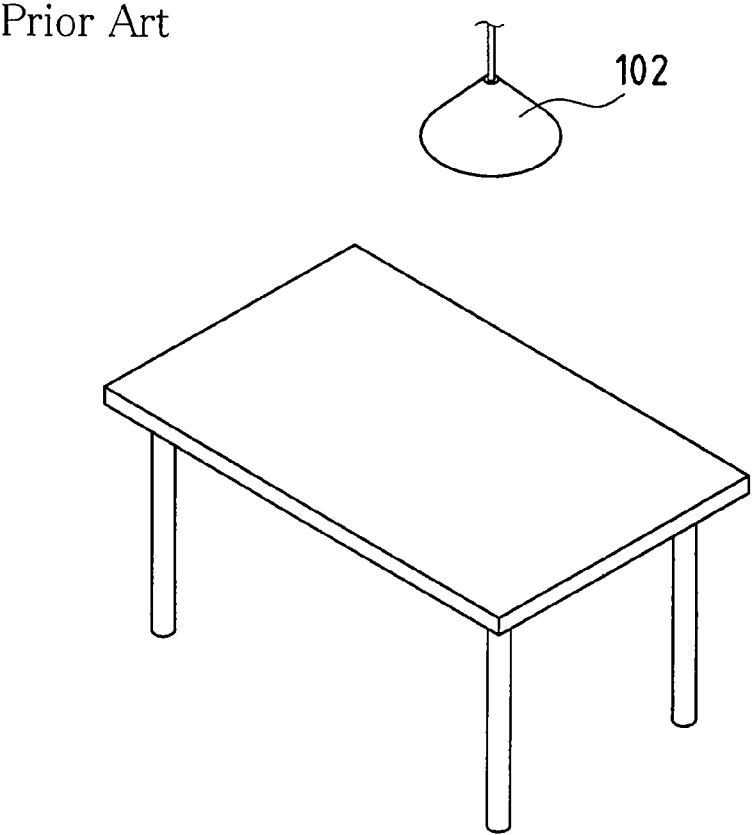
FIG. 22 is a perspective view showing a conventional interior light.

Also, a reflector 26B as shown in FIGS. 10 and 11 may be provided instead of the reflector 26. This reflector 26B has a round tabular shape, and the entire underside thereof faces directly downward. Therefore, most of the diffused light from the rod-like light-guiding bodies 14 is reflected downward by the entire bottom face of the reflector 26B and irradiated onto the floor, allowing illumination of the floor and ambient illumination by light reflected from the floor to be performed.

In the first and second embodiments, the tabular base is fixed to the floor, at least one rod-like light-guiding body and a strut protrude up from this tabular base, and a reflector is fixedly supported by the strut, making it impossible to freely move the lighting apparatus. However, as shown in FIGS. 12 to 15, the lighting apparatus may be constituted with at least one rod-like light-guiding body 14 and a strut 15 or 25 protruding up from a portable base 31, and a reflector 16, 26, 26A or 26B fixedly supported by the strut 15 or 25, thereby enabling the lighting apparatus to be moved.

Further, the shape of the reflector may be variously changed, and the reflective surface thereof may be a diffuse reflective surface rather than a mirror reflective surface. In the case where the reflector has a diffuse reflective surface, the diffusion of light can be further promoted.

The rod-like light-guiding body is not limited to being a cylindrical column, and may be a rectangular column or have another cross-sectional shape. Alternatively, a rod-like light-guiding body that has a varying diameter or that is curved or bent may be applied.

Also, a rod-like light-guiding body 14A as shown in FIG. 16 may be used instead of the rod-like light-guiding body 14. A texturing process has been performed on the outer peripheral surface of this rod-like light-guiding body 14A to form numerous small irregularities in the inner peripheral surface of this rod-like light-guiding body 14A. Therefore, when light from the LEDs 17 passes through the rod-like light-guiding body 14A, this light is diffuse-reflected by the inner peripheral surface of the rod-like light-guiding body 14A and reliably diffused, and this diffused light exits from the upper end 14a of the rod-like light-guiding body 14A. Also, the outer peripheral surface of the rod-like light-guiding body 14A radiates light uniformly, and the area around the lighting apparatus is uniformly illuminated by soft light.

Although the upper end face 14a of the rod-like light-guiding body 14 has a flat surface, alternatively an inclined end face 14c as shown in FIG. 17, a convex lenticular end face 14d as shown in FIG. 18, a concave lenticular end face 14e as shown in FIG. 19, or a conical end face 14f as shown in FIG. 20 may be applied. Selecting an end face with any of these shapes enables the extent of diffusion and the exit direction of the light to be variously set.

The present invention may be embodied in other forms without departing from the gist or essential characteristics thereof. The foregoing embodiments are therefore to be considered in all respects as illustrative and not limiting. The scope of the invention is indicated by the appended claims rather than by the foregoing description, and all modifications and changes that come within the meaning and range of equivalency of the claims are intended to be embraced therein.

What is claimed is:

1. An LED lighting apparatus suitable for use as an ambient light source, comprising:
   an LED provided on a base;
   a rod-like light-guiding body, the rod-like light-guiding body having translucency and being configured to illuminate with diffused light an area around the LED lighting apparatus by light that leaks from an outer periphery of the rod-like light-guiding body; and a light reflector disposed in a vicinity of an upper end of the rod-like light-guiding body, wherein at least a portion of light from the LED is incident on a lower end of the rod-like light-guiding body, exits from the upper end via the rod-like light-guiding body, and is reflected by the light reflector.

2. The LED lighting apparatus according to claim 1, wherein the light reflector mirror reflects the light from the upper end of the rod-like light-guiding body.

3. The LED lighting apparatus according to claim 1, wherein the light reflector diffuse-reflects the light from the upper end of the rod-like light-guiding body.

4. The LED lighting apparatus according to claim 1, further comprising plural pairs of the LED and the rod-like light-guiding body, wherein in each pair, light from the LED exits from the upper end of the rod-like light-guiding body and is reflected by the light reflector.

5. The LED lighting apparatus according to claim 1, wherein the upper end face of the rod-like light-guiding body is one of a convex lenticular end face, a concave lenticular end face, a conical end face and an inclined end face.

6. The LED lighting apparatus according to claim 1, wherein the LED lighting apparatus is an interior light.

7. The LED lighting apparatus according to claim 1, wherein the LED lighting apparatus is a table lamp.

8. The LED lighting apparatus according to claim 1, wherein an outer peripheral surface of the rod-like light-guiding body has a texture.

\* \* \* \* \*

UNITED STATES PATENT AND TRADEMARK OFFICE
CERTIFICATE OF CORRECTION

| | | |
|---|---|---|
| PATENT NO. | : 7,513,666 B2 | Page 1 of 1 |
| APPLICATION NO. | : 12/056760 | |
| DATED | : April 7, 2009 | |
| INVENTOR(S) | : Takuro Ishikura et al. | |

It is certified that error appears in the above-identified patent and that said Letters Patent is hereby corrected as shown below:

Title Page:

Please insert the following:

--(30)    Foreign Application Priority Data

Mar. 28, 2007    JAPAN   (JP) ...........................2007-085365--

Signed and Sealed this

Twenty-third Day of June, 2009

JOHN DOLL
*Acting Director of the United States Patent and Trademark Office*